(12) United States Patent
Shum et al.

(10) Patent No.: US 9,537,339 B2
(45) Date of Patent: Jan. 3, 2017

(54) HIGH-EFFICIENCY BATTERY CHARGER

(71) Applicants: Henry Shum, Hong Kong (CN);
Mathew Inskeep, Boca Raton, FL (US)

(72) Inventors: Henry Shum, Hong Kong (CN);
Mathew Inskeep, Boca Raton, FL (US)

(*) Notice: Subject to any disclaimer, the term of this patent is extended or adjusted under 35 U.S.C. 154(b) by 72 days.

(21) Appl. No.: 14/038,503

(22) Filed: Sep. 26, 2013

(65) Prior Publication Data

US 2014/0091754 A1   Apr. 3, 2014

Related U.S. Application Data

(60) Provisional application No. 61/707,197, filed on Sep. 28, 2012, provisional application No. 61/733,700, filed on Dec. 5, 2012.

(51) Int. Cl.
*H02J 7/00* (2006.01)
*H02J 7/14* (2006.01)
*H02J 7/04* (2006.01)

(52) U.S. Cl.
CPC .............. *H02J 7/0057* (2013.01); *H02J 7/045* (2013.01); *Y02B 40/90* (2013.01)

(58) Field of Classification Search
CPC ..................................................... H02J 7/0057
USPC ....... 320/107, 133, 155, 109, 105, 137, 104, 320/139, 140, 162
See application file for complete search history.

(56) References Cited

U.S. PATENT DOCUMENTS

| | | | |
|---|---|---|---|
| 3,479,563 A | 11/1969 | Roy | |
| 5,028,859 A | 7/1991 | Johnson et al. | |
| 5,057,762 A | 10/1991 | Goedken et al. | |
| 5,166,595 A * | 11/1992 | Leverich | 320/139 |
| 5,289,101 A | 2/1994 | Furuta et al. | |
| 6,822,425 B2* | 11/2004 | Krieger et al. | 320/139 |
| 2006/0028178 A1* | 2/2006 | Hobbs | 320/128 |
| 2006/0126364 A1* | 6/2006 | Yasumura | 363/16 |
| 2008/0185996 A1 | 8/2008 | Krieger et al. | |
| 2008/0246438 A1* | 10/2008 | Lu | 320/137 |
| 2009/0021218 A1* | 1/2009 | Kelty et al. | 320/137 |
| 2009/0079394 A1* | 3/2009 | Richards et al. | 320/134 |
| 2010/0264883 A1 | 10/2010 | Aiura | |
| 2011/0095727 A1* | 4/2011 | Yeh et al. | 320/138 |
| 2011/0304298 A1* | 12/2011 | Gow et al. | 320/107 |
| 2012/0249058 A1* | 10/2012 | Kuraishi | 320/107 |

OTHER PUBLICATIONS

International Search Report of PCT/US2013/061995 dated Mar. 11, 2014 with Written Opinion of the International Searching Authority.

* cited by examiner

*Primary Examiner* — Alexis A Boateng

(57) ABSTRACT

A high efficiency battery charger. The high-efficiency battery charger can include a first transformer to produce a charging current, a second transformer to produce a maintenance current lower than the charging current, a power feed circuit having an input for connection to a power source, and control circuitry configured to detect a depleted battery to cause the power feed circuitry to feed power to the first transformer while disabling the second transformer, and to detect a charged battery to cause the power feed circuitry to feed power to the second transformer while disabling the first transformer.

12 Claims, 2 Drawing Sheets

HIGH-EFFICIENCY BATTERY CHARGER

CROSS-REFERENCE TO RELATED APPLICATIONS

This application claims priority to U.S. Provisional Patent Application No. 61/707,197, filed on Sep. 28, 2012, titled "HIGH-EFFICIENCY BATTERY CHARGER," as well as U.S. Provisional Patent Application No. 61/733,700, filed Dec. 5, 2012, and titled "HIGH-EFFICIENCY BATTERY CHARGER." The disclosures of both foregoing applications are incorporated herein by reference along with each and every patent and patent application mentioned herein below.

TECHNICAL FIELD

The present invention relates generally to a battery charger, and, particularly, to a battery charger which can operate with high efficiency in various circumstances.

BACKGROUND

Linear style battery chargers are well-known in the art. Recently, multi-frequency and high-frequency battery chargers have entered the market and proven effective at providing charge energy to various types of batteries at a much increased efficiency. However, both types of battery chargers suffer from several significant drawbacks.

Generally, a large transformer provides more current than a smaller transformer, but also experiences greater electrical losses as it operates. Relatively large transformers are needed in order to provide the high current necessary to charge a battery. However, when a battery is fully charged, float charging or trickle charging the battery to maintain its charge only requires a relatively low current. Battery chargers which use only one transformer must select a large transformer in order to provide the high current necessary, but must endure the high losses of the large transformer even when providing only a maintenance charge. Using multiple transformers does little to remedy this if all of the transformers remain active and connected, as transformers experience electrical power loss even when they are not providing current.

SUMMARY

According to an exemplary embodiment of the present invention, a high efficiency battery charger is disclosed. The high-efficiency battery charger can include a first transformer to produce a charging current, a second transformer to produce a maintenance current lower than the charging current, a power feed circuit having an input for connection to a power source, and control circuitry configured to detect a depleted battery to cause the power feed circuitry to feed power to the first transformer while disabling the second transformer, and to detect a charged battery to cause the power feed circuitry to feed power to the second transformer while disabling the first transformer.

According to another exemplary embodiment, a high-efficiency battery charger is disclosed. The high-efficiency battery charger can include a power source, a plurality of transformers for providing power to a battery, power feed circuitry which can selectively provide power from the power source to one of the plurality of transformers while disconnecting the rest of the plurality of transformers from the power source, and control circuitry.

According to a still further exemplary embodiment, a method for operating a high-efficiency battery charger is disclosed. The method can include charging the battery using a main transformer that is larger than an auxiliary transformer, determining whether the battery is fully charged, disconnecting the main transformer when the battery is determined to be fully charged, and providing a maintenance charge using the auxiliary transformer while the main transformer is disconnected.

Further aspects, objectives, and advantages, as well as the structure and function of embodiments, will become apparent from a consideration of the description, drawings, and examples.

BRIEF DESCRIPTION OF THE DRAWINGS

The features and advantages of the invention will be apparent from the following drawings wherein like reference numbers generally indicate identical, functionally similar, and/or structurally similar elements.

DETAILED DESCRIPTION

Embodiments of the invention are discussed in detail below. In describing embodiments, specific terminology is employed for the sake of clarity. However, the invention is not intended to be limited to the specific terminology so selected. A person skilled in the relevant art will recognize that other equivalent parts can be employed and other methods developed without departing from the spirit and scope of the invention.

Figure 1:
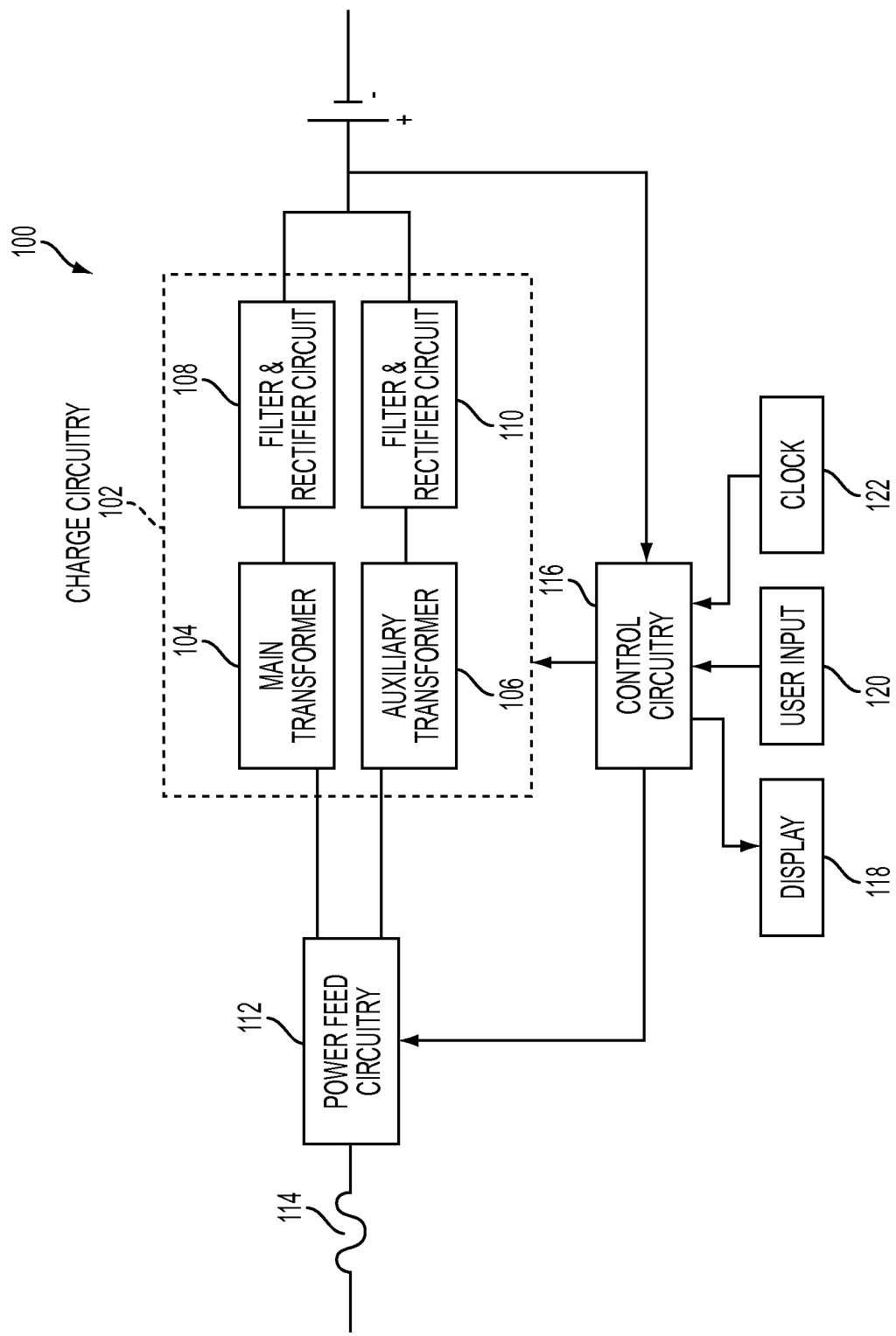
FIG. 1 is a block diagram of a high efficiency battery charger according to an embodiment of the invention.
Figure 2:
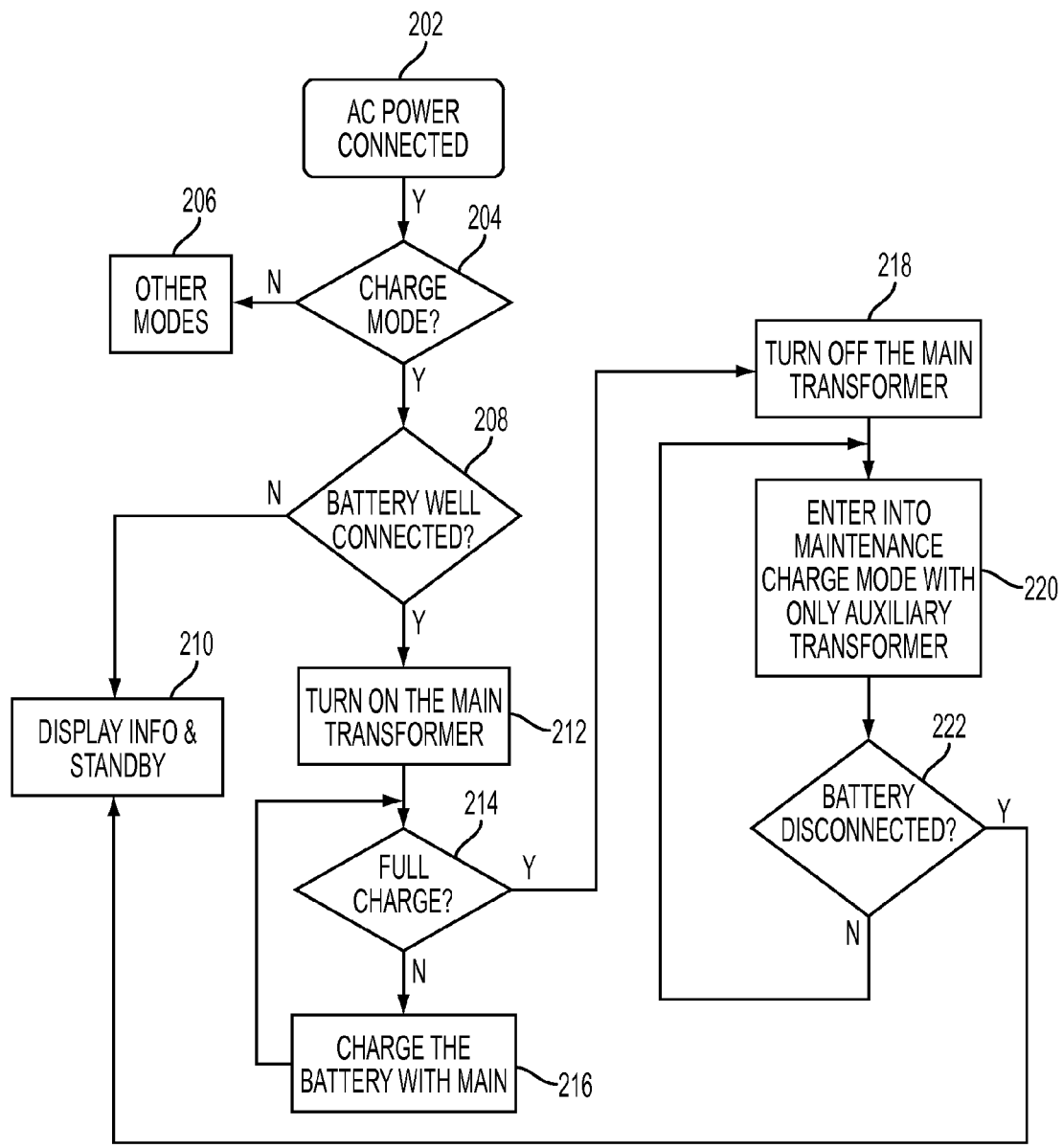
FIG. 2 is a flow chart of the operation of a high efficiency battery charger according to an embodiment of the invention.

Generally, FIGS. 1 and 2 relate to a high-efficiency battery charger 100. The high-efficiency battery charger 100 can include one or more independently operable transformers in its charging circuitry. The transformers can be optimized for different situations, allowing high-efficiency battery charger 100 to remain efficient across a variety of modes of operation.

FIG. 1 shows an exemplary embodiment of a high-efficiency battery charger 100. High-efficiency battery charger 100 can include charging circuitry 102. Charging circuitry 102 can include one or more transformers, for example main transformer 104 and auxiliary transformer 106. The transformers of charging circuitry 102 can be any type of transformer, for example linear transformers, high-frequency transformers, or any other type of transformers as desired, and any combination thereof The transformers of charging circuitry 102 can have any desired configuration, for example any desired size or shape. In some exemplary embodiments, the transformers of charging circuitry 102 can include, for example, E-E type core shapes, or E-I type core shapes, or any desired combination thereof. The size of the transformers in charging circuitry 102 can be understood in any desired terms, for example physical size. The size of the transformers in charging circuitry 102 can also be understood in terms of maximum power output capacity, or kilovolt-ampere (KVA) rating, in which a higher KVA rating for a specific input and output voltage indicates a larger transformer, as is well-known in the art.

In some exemplary embodiments, main transformer 104 and auxiliary transformer 106 can have different configurations, for example different shapes or sizes. In some exemplary embodiments, main transformer 104 can be larger than auxiliary transformer 106. For example, auxiliary transformer 104 can be an E-E or E-I type transformer with a core diameter in the range of 12 mm-16 mm, and main transformer can be an E-E or E-I type transformer with a core diameter in the range of 28 mm-55 mm, or even larger as desired. As a result, main transformer 104 can be capable of providing more current than auxiliary transformer 106, but can also be subject to higher energy losses during operation. As an example, in some embodiments main transformer 104 can provide current in a range of approximately 1 ampere to approximately 100 amperes, and auxiliary transformer 106 can provide current in a range of approximately 0 amperes to approximately 2 amperes. In further exemplary embodiments, main transformer 104 can also provide a boost current in a range of approximately 50 amperes to approximately 400 amperes.

Charging circuitry 102 can also include filter and rectifier circuits, for example filter and rectifier circuits 108 and 110, which can be coupled to main transformer 104 and auxiliary transformer 106, respectively. As an example, the rectifiers in the filter and rectifier circuits of charging circuitry 102 can be any desired number of diodes, for example one diode or four diodes. Additionally, the filters in the filter and rectifier circuits of charging circuitry 102 can be one or more capacitors or inductors, in any desired combination. The filter and rectifier circuits of charging circuitry 102 can be configured to rectify and condition the alternating current output of the transformers of charging circuitry 102 so that it is suitable for charging a battery, as is well-known to one skilled in the art.

Still referring to FIG. 1, high-efficiency battery charger 100 can also include power feed circuitry 112 and power source 114. Power source 112 can be any source of electrical power, for example a standard wall socket providing alternating current power. Power feed circuitry 112 can receive input from power source 114 and can filter or otherwise condition it in order to provide suitable output for charging circuitry 102. If, for example, one or more of the transformers of charging circuitry 102 is a high-frequency transformer, for example as known from U.S. Pat. No. 6,822,425, the entirety of which is incorporated herein by reference, then power feed circuitry 112 can include one or more switches suitable to drive the high-frequency transformers. The switches can be any type of switch as desired. In some exemplary embodiments, the switches can be field effect transistor (FET) switches, and can be controlled with pulse width modulation (PWM) controllers, as is well-known to one skilled in the art. Power feed circuitry 112 can selectively provide suitable output to any of the transformers of charging circuitry 102, alone or in combination. Power feed circuitry 112 can also disconnect transformers from power source 114 when the transformers are not in use. This can reduce the overall amount of electrical power loss in high-efficiency battery charger 100, as transformers generally experience electrical power loss whenever they are connected to a power source. In some exemplary embodiments, power feed circuitry 112 can isolate charging circuitry 102 from power source 114 using, for example, opto-couplers, opto-isolators, isolating transformers, or any other desired technique, as is well-known to one skilled in the art.

Again referring to FIG. 1, high-efficiency battery charger 100 can include control circuitry 116. Control circuitry 116 can be logic circuitry, can be programmable, such as a central processing unit (CPU) with associated memory, or can be any other desired type of control circuitry or combination thereof. Control circuitry 116 can include any type of control circuitry as desired, for example integrated circuits such as power management circuits or PWM controllers, or can be discrete logic components, as desired. Control circuitry 116 can receive input from and provide control output to any other component of high-efficiency battery charger 100, as desired. For example, control circuitry 116 can accept clock input from clock 122. Control circuitry 116 can also receive input relating to information regarding the state of the battery connected to high-efficiency battery charger 100, for example battery type, battery connection status, or battery polarity. Control circuitry 116 can also receive input regarding the status of high-efficiency battery charger 100, for example operating mode, transformer operation status, power supply voltage, battery voltage, charging voltage, charging current, frequency, engine start detection, the amount of time any of the above has been applied or has left to be applied, or any other information as desired.

In some exemplary embodiments, control circuitry 116 can also accept input from user input 120. User input 120 can be one or more buttons, switches, keyboards, dials, or any other type of input as desired. User input 120 can allow a user to provide information regarding the operation of high-efficiency battery charger 100, for example battery type, battery size, battery voltage, power source type, or any other information as desired. User input 120 can allow a user to make selections regarding the desired function of high-efficiency battery charger 100, for example desired operating mode, transformer operation status, power supply voltage, charging voltage, charging current, frequency, amount of time desired for any function, or any other function as desired.

Control circuitry 116 can make use of the inputs received to provide output to other components of high-efficiency battery charger 100. For example, control circuitry 116 can provide control output to display 118. Display 118 can be any type of display, for example one or more cathode ray tubes (CRT), light-emitting diodes (LED), electroluminescent displays (ELD), electronic paper or E-Ink displays, plasma display panels (PDP), liquid crystal displays (LCD), or any other type of display as desired. Display 118 can display any type of information relating to the function of high-efficiency battery charger 100, for example operating mode, battery type, battery connection status, battery polarity, power supply voltage, battery voltage, charging voltage, charging current, frequency, engine start detection, the amount of time any of the above has been applied or has left to be applied, or any other information as desired.

Control circuitry 116 can also provide control output to power feed circuitry 112 and charging circuitry 102. In some exemplary embodiments, control circuitry 116 can instruct power feed circuitry to provide power from power source 114 to one of the transformers of charging circuitry 102 and to disconnect the rest of the transformers of charging circuitry 102. This can reduce the overall amount of electrical power loss in high-efficiency battery charger 100, as transformers generally experience electrical power loss whenever they are connected to a power source.

In some exemplary embodiments, high-efficiency battery charger 100 can also include any other components, as desired, for example fans or other cooling devices.

High-efficiency battery charger 100 can operate according to any desired protocol. High-efficiency battery charger 100 can operate in one or more modes, for example charge mode and maintenance charge mode. In some exemplary embodiments, when high-efficiency battery charger 100 is in charge mode, control circuitry 116 can instruct power feed circuitry 112 to provide power to main transformer 104 while disconnecting auxiliary transformer 106. In further exemplary embodiments, when high-efficiency battery charger 100 is in maintenance charge mode, control circuitry 116 can instruct power feed circuitry 112 to provide power to auxiliary transformer 106 while disconnecting main transformer 104. In this way, high-efficiency battery charger 100 can enter charge mode when the high current which can be provided by main transformer 104 is required, and can enter maintenance charge mode to provide a low-loss no-load, float, or trickle charge from auxiliary transformer 106 when the high losses associated with main transformer 104 are not desirable.

Turning now to FIG. 2, an exemplary embodiment of a protocol for operating high-efficiency battery charger 100 is shown. At step 202, control circuitry 116 can determine that AC power source 114 has been connected to power feeds 112. At step 204, control circuitry can determine which mode has been selected based on user input 120. If charge mode has not been selected, high-efficiency battery charger 100 can enter another mode at step 206. If charge mode has been selected, control circuitry 116 can determine at step 208 whether the battery is properly connected. If the battery is not properly connected, for example the polarities are reversed at clamps connecting the charger to battery terminals, control circuitry 116 can move to step 110 and instruct display 118 to display this information and stand by for further user input. If the battery is well-connected, control circuitry 116 can, at step 212, instruct power feed circuitry 112 to provide power from the power source 114 to main transformer 104 while disconnecting auxiliary transformer 106. At step 214, control circuitry 116 can determine whether the battery is fully charged. If the battery is not fully charged, high-efficiency battery charger 100 can continue charging the battery with main transformer 104 and return to step 214. If the battery is fully charged, control circuitry 116 can proceed to step 218 and instruct power feed circuitry 112 to disconnect main transformer 104. The control circuitry 116 can then, at step 220, charge the battery in maintenance charge mode using only auxiliary transformer 106, and can do so at step 222 until the battery is disconnected.

In other exemplary embodiments, high-efficiency battery charger 100 can use any protocol as desired. For example, high-efficiency battery charger 100 can enter charge mode for an amount of time set by the user, or on a schedule specified by the user. High-efficiency battery charger 100 can switch from charge mode to maintenance charge mode when the battery is detected to be full, when the battery has reached a pre-determined voltage, or under any other desired conditions.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

We claim:

1. A high efficiency battery charger, comprising:
  a first transformer to produce a charging current suitable for charging a depleted battery and having a first output to couple the charging current to the depleted battery;
  a second transformer to produce a trickle current lower than the charging current, wherein the trickle current is 0 amperes to 2 amperes, the second transformer having a second output to couple the trickle current, to a charged battery;
  a power feed circuit having an input for connection to a power source and an output connected to respective ones of the first and second transformers; and
  control circuitry having an input coupled to the first and second outputs and an output coupled to the power feed circuitry,
  wherein the control circuitry is configured to detect a depleted battery to cause the power feed circuitry to feed power to the first transformer while disabling the second transformer and to detect a charged battery to cause the power feed circuitry to feed power to the second transformer while disabling the first transformer.

2. The high-efficiency battery charger of claim 1, wherein the first transformer provides the charging current in the range of greater than 2 amperes to 100 amperes.

3. The high-efficiency battery charger of claim 2, wherein the first transformer provides a boost current in the range of 50 amperes to 400 amperes.

4. The high efficiency battery charger of claim 1, wherein at least one of the first transformer and the second transformer comprise at least one of an E-E type core shape or an E-I type core shape.

5. The high-efficiency battery charger of claim 4, wherein the first transformer has a core diameter in the range of 28 millimeters to 55 millimeters.

6. The high-efficiency battery charger of claim 4, wherein the second transformer has a core diameter in the range of 12 millimeters to 16 millimeters.

7. A high-efficiency battery charger, comprising:
  a power source;
  a plurality of transformers for providing power to a battery, wherein a first transformer is larger than a second transformer and provides a high current suitable for charging a depleted battery;
  power feed circuitry, wherein the power feed circuitry is configured to selectively provide power from the power source to one of the plurality of transformers while disconnecting the rest of the plurality of transformers from the power source; and
  control circuitry, wherein the control circuitry is configured to instruct the power feed circuitry to selectively provide power to the first transformer when high current is required, and to the second transformer when high current is not required.

8. The high-efficiency battery charger of claim 7, wherein the control circuitry is configured to instruct the power feed circuitry to selectively provide power to the first transformer when the battery is detected to be less than fully charged, and to the second transformer when the battery is detected to be fully charged.

9. The high-efficiency battery charger of claim 7, wherein the control circuitry is configured to instruct the power feed circuitry to selectively provide power to the first transformer when a voltage of the battery is detected to be below a specified voltage, and to the second transformer when a voltage of the battery is detected to be at or above the specified voltage.

10. The high-efficiency battery charger of claim 7, wherein the control circuitry is configured to instruct the power feed circuitry to selectively provide power to the first transformer for a first amount of time, and to the second transformer for a second amount of time.

11. The high-efficiency battery charger of claim 10, wherein the first amount of time and the second amount of time are determined according to a schedule.

12. A method for operating a high-efficiency battery charger, comprising:
  charging a depleted battery using a main transformer that is larger than an auxiliary transformer and which produces a current suitable for charging the depleted battery;
  determining whether the battery is fully charged;
  disconnecting the main transformer when the battery is determined to be fully charged; and
  providing a trickle charge using the auxiliary transformer while the main transformer is disconnected.

* * * * *